United States Patent [19]
Yatka et al.

[11] Patent Number: 5,800,848
[45] Date of Patent: Sep. 1, 1998

[54] CHEWING GUM CONTAINING SUCROSE POLYESTERS

[75] Inventors: Robert J. Yatka, Orland Park; Michael J. Greenberg, Northbrook; Michael T. Bunczek, Lisle, all of Ill.; Roy L. Whistler, West Lafayette, Ind.; David W. Record, River Forest, Ill.; Michael A. Reed, Merriville, Ind.

[73] Assignee: the Wm. Wrigley Jr. Company, Chicago, Ill.

[21] Appl. No.: 793,191

[22] PCT Filed: Jun. 20, 1995

[86] PCT No.: PCT/US95/07826

§ 371 Date: May 15, 1997

§ 102(e) Date: May 15, 1997

[87] PCT Pub. No.: WO97/00618

PCT Pub. Date: Jan. 9, 1997

[51] Int. Cl.$^6$ .................................... A23G 3/30
[52] U.S. Cl. ........................... 426/3; 426/4; 426/6
[58] Field of Search .............................. 426/3, 4, 6

[56] References Cited

U.S. PATENT DOCUMENTS

| | | | |
|---|---|---|---|
| 4,933,190 | 6/1990 | Cherukuri et al. | 426/5 |
| 4,983,404 | 1/1991 | Raman et al. | 426/3 |
| 5,057,328 | 10/1991 | Cherukuri et al. | 426/5 |

*Primary Examiner*—Arthur L. Corbin
*Attorney, Agent, or Firm*—Hill & Simpson

[57] ABSTRACT

Chewing gum formulations and bases, as well as methods of producing chewing gum and bases are provided. The chewing gum includes sucrose polyesters, which can be used in the base and/or gum as a plasticizer, softener, and emulsifier. In one embodiment, sucrose polyesters are added to sucrose-type gum formulations replacing a quantity of fats, oils, and/or emulsifiers.

18 Claims, No Drawings

CHEWING GUM CONTAINING SUCROSE POLYESTERS

BACKGROUND OF THE INVENTION

The present invention relates generally to chewing gum. More specifically, the present invention relates to improved formulations for chewing gum and bases.

Chewing gum generally consists of a water insoluble gum base and a water soluble portion along with flavors. The water soluble portion and flavors dissipate during chewing and the gum base is retained in the mouth throughout the chew.

The insoluble gum base generally comprises elastomers, resins, fats and oils, softeners, and inorganic fillers. Elastomers can include synthetic elastomers including polyisobutylene, isobutylene-isoprene copolymers, styrene-butadiene copolymers, polyvinyl acetate, polyisoprene, polyethylene, vinyl acetate—vinyl laurate copolymers, and combinations thereof. Natural elastomers that can be used include natural rubber.

The gum base can include elastomer plasticizers. Such elastomer plasticizers can include natural rosin esters, as well as other elastomer plasticizers. Additionally, the gum base can include fillers/texturizers and softeners/emulsifiers. Softeners are added to chewing gum in order to optimize the chewability and mouth feel of the gum. Softeners/emulsifiers that are typically used include tallow, hydrogenated tallow, hydrogenated and partially hydrogenated vegetable oils, cocoa butter, glycerol monostearate, glycerol triacetate, lecithin, and combinations thereof.

In addition to a water insoluble gum base portion, a typical chewing gum composition includes a water soluble portion and one or more flavoring agents. The water soluble portion can include bulk sweeteners, high intensity sweeteners, flavoring agents, softeners, emulsifiers, colors, acidulants, fillers, antioxidants, and other components that provide desirable attributes.

SUMMARY OF THE INVENTION

The present invention provides improved chewing gum formulations and bases, as well as methods of producing chewing gum and bases. Pursuant to the present invention, chewing gum is provided that includes sucrose polyesters (SPEs). Sucrose polyesters are used in the base and/or gum formulations as plasticizers, softeners, and/or emulsifiers. In an embodiment, sucrose polyesters are added to sucrose-type gum formulations replacing a small or large quantity of other fats, oils, emulsifiers, and softeners.

A variety of base and chewing gum formulations including sucrose polyesters can be created and/or utilized pursuant to the present invention. The base formulations of the present invention may be conventional bases that include wax or are wax-free, tacky or non-tacky and/or bubble gum-type bases. The gum formulations can be low or high moisture formulations containing low or high amounts of moisture-containing syrup. Sucrose polyesters can also be used in low sugar and non-sugar containing gum formulations made with sorbitol, mannitol, other polyols, and non-sugar carbohydrates. Non-sugar formulations can include low or high moisture sugar-free chewing gums.

In an embodiment, sucrose polyesters are used as a softener and are combined with other base softeners for use in chewing gum base. Such other softeners include, but are not limited to, fats and oils, such as tallow, hydrogenated and partially hydrogenated vegetable oils, cocoa butter, mono- and di-glycerides, acetylated monoglycerides, softeners such as glycerol triacetate, waxes such as paraffin and microcrystalline waxes, and emulsifiers such as lecithin.

In an embodiment, the sucrose polyesters are used as a softener in chewing gum formulations to replace typical chewing gum softeners. In an embodiment, sucrose polyesters are used in the chewing gum formulation to replace typical plasticizers and emulsifying agents that are used in chewing gum formulations. For example, sucrose polyesters can be used to replace glycerin, lecithin, glycerol triacetate, acetylated monoglycerides, and mono- and di-glycerides.

In an embodiment, the sucrose polyesters softeners are used in a chewing gum formulation combined with other softeners, emulsifiers, and plasticizing agents. If desired, the sucrose polyesters can be used alone or combined with an inert material which may be added in a dry form. The sucrose polyesters softener can also be melted and added to the flavor as a carrier for its use in chewing gum.

The sucrose polyesters softener, when used according to the present invention, affords the chewing gum an improved texture, improved shelf life, and improved flavor quality. Even though sucrose polyesters are similar to other fats and oils in some respects, sucrose polyesters have significant softening effects that create a resultant chewing gum product that has a high consumer-acceptability.

In an embodiment, the present invention provides a gum base comprising an elastomer and at least 0.02% by weight of sucrose polyesters.

In an embodiment, the present invention provides a chewing gum formulation comprising an insoluble gum base, a water soluble portion, a flavor, and at least 0.01% by weight of sucrose polyesters.

It is an advantage of the present invention to provide an improved chewing gum formulation.

A further advantage of the present invention is to provide an improved base that can be used to create chewing gum.

Another advantage of the present invention is that it provides an improved chewing gum softener.

Still further, an advantage of the present invention is that it provides an improved chewing gum plasticizer.

Additionally, an advantage of the present invention is that it provides an improved emulsifying agent for chewing gum.

Moreover, an advantage of the present invention is that it provides an improved method for creating chewing gum.

Furthermore, an advantage of the present invention is that it provides a chewing gum having improved texture.

An advantage of the present invention is that it provides a chewing gum having an improved shelf life.

Still further, an advantage of the present invention is that it provides a chewing gum having improved flavor quality.

Additional features and advantages of the present invention are described in, and will be apparent from, the detailed description of the presently preferred embodiments.

DETAILED DESCRIPTION OF THE PREFERRED EMBODIMENTS

The present invention provides improved chewing gum formulations and base formulations. Pursuant to the present invention, sucrose polyesters are used. The sucrose polyester can be used in chewing gum formulations and/or bases. Specifically, the sucrose polyesters can be used as a softener, plasticizer, and/or emulsifying agent.

Sucrose esters include sucrose polyesters and sucrose fatty acid esters. Sucrose esters are a group of components synthesized by esterification of fatty acids from natural triglycerides and sucrose. The esters have a structure typical of surfactants containing both polar and non-polar groups on the same molecule. Since sucrose has a total of eight hydroxyl groups, three are primary and five are secondary, compounds ranging from sucrose mono- to octa- fatty acids esters can be produced. Although fatty acids in the $C_8$ to $C_{22}$ range are suitable to esterify sucrose, long chain fatty acids of $C_{14}$ to $C_{18}$ are preferred. Such long chain fatty acids include sucrose laurate, sucrose palmitate, sucrose stearate and sucrose oleate.

Sucrose esters that have one, two or three fatty acids, or mono, di, and triesters, are referred to as sucrose fatty acid esters (SFAEs). Other sucrose esters that have four or more, up to eight fatty acids esters, are referred to as sucrose polyesters (SPEs). Sucrose fatty acid esters with toxicological clearance have been approved for specific uses in the United States since 1983.

The materials approved for food use are mixtures of mono-, di-, and triesters of palmitic and stearic acids. FDA and EC (European Community) standards require a minimum of 80% total content of mono-, di-, and triester to be food approved. Sucrose polyesters with four or more fatty acids are not approved for food use in the United States or EC.

The classic way to characterize sucrose fatty acid esters is by hydrophilic-lipophilic balance (HLB). The HLB of sucrose fatty acid esters can range from approximately 2 to about 18.

Sucrose fatty acid esters that have a high HLB are more hydrophilic, and those with a low HLB are lipophilic. Generally, sucrose fatty acid esters with more hydroxyl groups and fewer fatty acids are more hydrophilic such as mono esters. Sucrose fatty acid esters that are esterified with more fatty acids are more lipophilic with a low HLB. Sucrose polyesters with 4 or more fatty acids are very lipophilic with an HLB of about 1.

Sucrose polyesters have very similar properties to fats and oils, but are non-digestible. A sucrose polyester called Olestra is currently being developed as a fat substitute by Proctor and Gamble. The inventors believe that the original patent for Olestra is U.S. Pat. No. 3,600,186. Olestra contains mostly hexa-, hepta- and octa- esters of fatty acids. Sucrose polyesters are made by the reaction of sucrose octoacetate (SOAC) and the methyl ester of the fatty acid (FAME) to obtain the sucrose octa fatty acid polyester. Such fatty acids could be sucrose octapalmitable, sucrose octostearate, or sucrose octooleate.

Other sucrose polyesters are available that may also have 4, 5, 6 or 7 fatty acids esterified on the sucrose molecule or these may be a blend of sucrose polyesters. Some of these sucrose polyesters may be available as DK Esters from Dai-Ichi Kogyo Seiyaku Co., Ltd., of Japan through Montello Co. of Tulsa, Okla. Also some sucrose polyesters may be available from Mitsubishi Kasei Food Corp. of Tokyo, Japan as Ryoto Sugar Esters. These materials although not food approved, would have better emulsifying properties than the sucrose octoesters.

Pursuant to the present invention, sucrose polyesters can be used in base formulations and/or chewing gum formulations. In this regard, the sucrose polyesters can be used as softeners, plasticizers, and/or emulsifying agents. The sucrose polyesters can be used in a variety of different chewing gum and base formulations.

As previously noted, chewing gum generally consists of a water insoluble gum base, a water soluble portion, and flavors.

The insoluble gum base generally comprises elastomers, resins, fats and oils, softeners, and inorganic fillers. The gum base may or may not include wax. The insoluble gum base can constitute approximately 5 to about 95 percent, by weight, of the chewing gum, more commonly, the gum base comprises 10 to about 50 percent of the gum, and in some preferred embodiments, 20 to about 35 percent, by weight, of the chewing gum.

In an embodiment, the chewing gum base of the present invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with a GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters, often called estergums, such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

In an embodiment, in addition to the sucrose polyesters, pursuant to the present invention, softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. Waxes may include synthetic waxes such as microcrystalline or paraffin waxes, or natural waxes such as carnauba, beeswax, candellila, or polyethylene wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

The softeners, which are also known as plasticizers and plasticizing agents, generally constitute between approximately 0.5 to about 15% by weight of the chewing gum. The softeners may, in addition to including sucrose polyesters, include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sorbitol can be used as a sugarless sweetener. Additionally, sugarless sweeteners can include, but are not limited to, other sugar alcohols such as mannitol, xylitol, hydrogenated starch hydrolysates, maltitol, and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose; Raftilose, Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

The present invention, it is believed, can be used with a variety of processes for manufacturing chewing gum.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets.

Generally, the ingredients are mixed by first melting the gum base and adding it to the running mixer. The gum base may alternatively be melted in the mixer. Color and emulsifiers can be added at this time.

A chewing gum softener such as glycerin can be added next along with part of the bulk portion. Further parts of the bulk portion may then be added to the mixer. Flavoring agents are typically added with the final part of the bulk portion. The entire mixing process typically takes from five to fifteen minutes, although longer mixing times are sometimes required.

Sucrose polyesters in its molten or solid form may be added to chewing gum during manufacture of the base. Sucrose polyesters may be added at any time during processing of the base, but preferably, near the end of the batch to act as a softener.

Sucrose polyesters may be added to conventional bases that contain wax or are wax-free bases, that may or may not contain polyvinyl acetate or terpene resins, or bases that contain natural gums or synthetic bases, bases that are non-tacky, or are bubble gum bases.

At levels of approximately 0.02% to about 40% by weight of the gum base, sucrose polyesters may replace some or most of the partially hydrogenated or hydrogenated vegetable oils, mono- and di-glycerides, acetylated monoglycerides, or other softeners used in the gum base. Sucrose polyesters may also be blended with the other softeners in the gum base and added during the base manufacturing process. A chewing gum base made with some sucrose polyesters will have greater oxidative stability due to the presence of sucrose polyesters, and will give chewing gum a cleaner taste due to a reduction of off-tasting fats and oils.

Sucrose polyesters may also be added to a chewing gum formulation in its molten or solid form or may be mixed with other gum or base softeners and added to a gum formulation during processing. Sucrose polyesters may be added during the gum manufacturing at any time during processing, but preferably, early in the batch to allow thorough mixing with the gum base.

Sucrose polyesters can be added to the chewing gum formulation so that they comprise approximately 0.01% to about 5% by weight of the chewing gum formulation. In a preferred embodiment, the sucrose polyesters comprise approximately 0.02% to about 2% and most preferably, about 0.05% to about 0.5% by weight of the chewing gum formulation. Sucrose polyesters may be blended with other softeners such as lecithin, glycerol triacetate, acetylated monoglycerides, mono- and di-glycerides, or other vegetable oils and fats that may be added to a gum formulation. When another softener is used, such as lecithin, sucrose polyesters may act as a carrier or solvent for the particulate lecithin. Lecithin when mixed with molten sucrose polyesters may allow for an easier dispersion of lecithin in a gum formulation. This should be contrasted with soy bean oil that is typically used as a carrier for lecithin.

Sucrose polyesters may also be blended with a wide range of natural and artificial flavor oils and act as a carrier for flavor oils. Some sucrose polyesters are dispersible with/or dissolved in flavors such as spearmint, peppermint, cinnamon, wintergreen, and fruit flavors. The level of sucrose polyesters mixed with flavors can vary over a wide range from approximately 1% to about 99% by weight since most gum flavors are oil soluble.

Sucrose polyesters can also act as a carrier for artificial and natural colors such as in FD&C lake dispersions and natural colors like betacarotene. Some sucrose polyesters may eliminate the off-taste associated with fat/oil carriers and allows higher usage of color.

Some sucrose polyesters may also be used as a release agent for encapsulated flavors. Some sucrose polyesters can be added to an encapsulating media to allow for faster and easier dissolution of the encapsulating media.

Some sucrose polyesters, also known as emulsifiers, have higher HLB values and may be effective as a surface active agent. Thus, sucrose polyesters can be mixed with the flavor and carrier to provide an easier encapsulation of flavors.

The use of sucrose polyester in chewing gum has a unique benefit not found in other types of food products. The chewing gum bolus is not ingested, but discarded, and is generally very lipophilic. Fat, oils, some emulsifiers, and softeners of the gum base remain in the gum bolus and are therefore not ingested, but discarded. As a result, sucrose polyesters which are very lipophilic may be used in chewing gum base, remain in the gum bolus, and be discarded with the gum bolus. In most foods, sucrose polyester is ingested, but because of its structure is not digestible, and therefore causes a problem called "anal leakage." However, in chewing gum, the gum bolus containing sucrose polyester is discarded and not ingested, and therefore may be used in chewing gum without causing the "anal leakage" problem.

By way of example, and not limitation, examples of the present invention will now be given:

EXAMPLES

The following contemplative examples of the invention and comparative examples are provided by way of explanation and illustration and not limitation.

The formulas listed in Table I comprise various contemplative sugar formulas in which sucrose polyesters (SPE) can be added at various levels to gum. Sucrose polyesters may be any sucrose ester having 4 or more fatty acid ester units, and preferably 8 fatty acid units such as Olestra.

TABLE 1

(WEIGHT PERCENT)

| | Ex. 1 | Ex. 2 | Ex. 3 | Ex. 4 | Ex. 5 | Ex. 6 |
|---|---|---|---|---|---|---|
| Sugar | 61.55 | 61.5 | 61.35 | 62.5 | 62.0 | 61.0 |
| Base | 19.2 | 19.2 | 19.2 | 19.2 | 19.2 | 19.2 |
| Corn Syrup | 16.9 | 16.9 | 16.9 | 16.9 | 16.9 | 16.9 |
| Peppermint Flavor | 0.9 | 0.9 | 0.9 | 0.9 | 0.9 | 0.9 |
| Glycerin | 1.4 | 1.4 | 1.4 | 0.0 | 0.0 | 0.0 |
| SPEs | 0.05 | 0.10 | 0.25 | 0.50 | 1.0 | 2.0 |

TABLE 2

| | Ex. 7 | Ex. 8 | Ex. 9 | Ex. 10 | Ex. 11 | Ex. 12 |
|---|---|---|---|---|---|---|
| Sugar | 55.65 | 55.6 | 55.45 | 56.2 | 55.7 | 54.7 |
| Base | 19.2 | 19.2 | 19.2 | 19.2 | 19.2 | 19.2 |
| Corn Syrup | 12.9 | 12.9 | 12.9 | 12.9 | 12.9 | 12.9 |
| Glycerin | 1.4 | 1.4 | 1.4 | 0.4 | 0.4 | 0.4 |
| Dextrose Monohydrate | 9.9 | 9.9 | 9.9 | 9.9 | 9.9 | 9.9 |
| Peppermint Flavor | 0.9 | 0.9 | 0.09 | 0.9 | 0.9 | 0.9 |
| SPEs | 0.05 | 0.10 | 0.25 | 0.50 | 1.0 | 2.0 |

Examples 13–18 are the same as Examples 7–12 except that sucrose polyesters are pre-blended with the peppermint flavor and added to the gum formulation.

The following Tables 3 through 10 give examples of gum formulations demonstrating formula variations in which sucrose polyesters in a molten form or solid, can be used.

Examples 19–23 in Table 3 demonstrate the use of PGE in low-moisture sugar formulations having less than 2% theoretical moisture:

TABLE 3

| | Ex. 19 | Ex. 20 | Ex. 21 | Ex. 22 | Ex. 23 |
|---|---|---|---|---|---|
| Sugar | 58.75 | 58.6 | 58.3 | 52.7 | 51.9 |
| Gum Base | 19.2 | 19.2 | 19.2 | 19.2 | 19.2 |
| Corn Syrup<sup>a</sup> | 6.0 | 6.0 | 6.0 | 6.0 | 6.0 |
| Dextrose Monohydrate | 10.0 | 10.0 | 10.0 | 10.0 | 10.0 |
| Lactose | 0.0 | 0.0 | 0.0 | 5.0 | 5.0 |
| Glycerin<sup>b</sup> | 5.0 | 5.0 | 5.0 | 5.0 | 5.0 |
| Flavor | 0.9 | 0.9 | 0.9<sup>d</sup> | 0.9<sup>d</sup> | 0.9<sup>d</sup> |
| Lecithin<sup>c</sup> | 0.1 | 0.1 | 0.1 | 0.2 | — |
| SPEs | 0.05 | 0.2 | 0.5<sup>d</sup> | 1.0<sup>d</sup> | 2.0<sup>d</sup> |

<sup>a</sup>Corn syrup is evaporated to 85% solids, 15% moisture.
<sup>b</sup>Glycerin and syrup can be blended and co-evaporated.
<sup>c</sup>Lecithin and SPEs can be pre-blended.
<sup>d</sup>Flavor and SPEs can be pre-blended.

Examples 24–28 in Table 4 demonstrate the use of sucrose polyesters in medium-moisture sugar formulations having about 2% to about 5% moisture.

TABLE 4

| | Ex. 24 | Ex. 25 | Ex. 26 | Ex. 27 | Ex. 28 |
|---|---|---|---|---|---|
| Sugar | 53.35 | 53.2 | 52.9 | 52.3 | 51.5 |
| Gum Base | 19.2 | 19.2 | 19.2 | 19.2 | 19.2 |
| Corn Syrup<sup>a</sup> | 15.0 | 15.0 | 15.0 | 15.0 | 15.0 |
| Dextrose | 10.0 | 10.0 | 10.0 | 10.0 | 10.0 |

TABLE 4-continued

|  | Ex. 24 | Ex. 25 | Ex. 26 | Ex. 27 | Ex. 28 |
|---|---|---|---|---|---|
| Monohydrate |  |  |  |  |  |
| Glycerin[b] | 1.4 | 1.4 | 1.4 | 1.4 | 1.4 |
| Flavor | 0.9[d] | 0.9[d] | 0.9[d] | 0.9[d] | 0.9[d] |
| Lecithin[c] | 0.1 | 0.1 | 0.1 | 0.2 | — |
| SPEs | 0.05[d] | 0.2[d] | 0.5[d] | 1.0[d] | 2.0[d] |

[a]Corn syrup is evaporated to 85% solids, 15% moisture.
[b]Glycerin and syrup can be blended and co-evaporated.
[c]SPEs and Lecithin can be pre-blended.
[d]Flavor and SPEs can be pre-blended.

Examples 29–33 in Table 5 demonstrate the use of sucrose polyesters in high moisture sugar formulations having more than about 5% moisture.

TABLE 5

|  | Ex. 29 | Ex. 30 | Ex. 31 | Ex. 32 | Ex. 33 |
|---|---|---|---|---|---|
| Sugar | 50.95 | 50.7 | 50.4 | 48.9 | 48.0 |
| Gum Base | 24.0 | 24.0 | 24.0 | 24.0 | 24.0 |
| Corn Syrup | 24.0 | 24.0 | 24.0 | 24.6 | 24.6 |
| Glycerin | 0.0 | 0.0 | 0.0 | 0.4 | 0.4 |
| Flavor | 1.0 | 1.0 | 1.0 | 1.0 | 1.0 |
| Lecithin* | — | 0.1 | 0.1 | 0.1 | — |
| SPEs | 0.05 | 0.2 | 0.5 | 1.0 | 2.0 |

*Lecithin and SPEs can be pre-blended.

Examples 34–38 in Table 6 and Examples 39–48 in Tables 7 and 8 demonstrate the use of sucrose polyesters in low- and high-moisture gums that are sugar-free. Low-moisture gums have less than about 2% moisture, and high-moisture gums have greater than 2% moisture.

TABLE 6

|  | Ex. 34 | Ex. 35 | Ex. 36 | Ex. 37 | Ex. 38 |
|---|---|---|---|---|---|
| Base | 25.5 | 25.5 | 25.5 | 25.5 | 25.5 |
| Sorbitol | 50.85 | 50.7 | 50.5 | 50.0 | 48.0 |
| Mannitol | 12.0 | 12.0 | 12.0 | 12.0 | 13.0 |
| Glycerin | 10.0 | 10.0 | 10.0 | 10.0 | 10.0 |
| Flavor | 1.5 | 1.5 | 1.5 | 1.5 | 1.5 |
| Lecithin* | 0.1 | 0.1 | — | — | — |
| SPEs | 0.05 | 0.2 | 0.5 | 1.0 | 2.0 |

*Lecithin and SPEs can be pre-blended.
**Flavor and SPEs can be pre-blended.

TABLE 7

|  | Ex. 39 | Ex. 40 | Ex. 41 | Ex. 42 | Ex. 43 |
|---|---|---|---|---|---|
| Base | 25.5 | 25.5 | 25.5 | 25.5 | 25.5 |
| Sorbitol | 50.95 | 50.8 | 50.5 | 51.9 | 49.8 |
| Sorbitol Liquid* | 10.0 | 10.0 | 10.0 | 10.0 | 11.0 |
| Mannitol | 10.0 | 10.0 | 10.0 | 10.0 | 10.0 |
| Glycerin | 2.0 | 2.0 | 2.0 | 0.0 | 0.0 |
| Flavor | 1.5 | 1.5 | 1.5 | 1.5 | 1.5 |
| Lecithin** | — | — | — | 0.1 | 0.2 |
| SPEs | 0.05 | 0.2 | 0.5 | 1.0 | 2.0 |

*Sorbitol liquid contains 70% sorbitol, 30% water.
**Lecithin and SPEs can be pre-blended.
***Flavor and SPEs can be pre-blended.

TABLE 8

|  | Ex. 44 | Ex. 45 | Ex. 46 | Ex. 47 | Ex. 48 |
|---|---|---|---|---|---|
| Base | 25.5 | 25.5 | 25.5 | 25.5 | 25.5 |
| Sorbitol | 50.95 | 50.7 | 50.4 | 52.0 | 51.0 |
| HSH Syrup* | 10.0 | 10.0 | 10.0 | 10.0 | 10.0 |
| Mannitol | 8.0 | 8.0 | 8.0 | 8.0 | 9.0 |
| Glycerin** | 4.0 | 4.0 | 4.0 | 2.0 | 1.0 |
| Flavor | 1.5 | 1.5 | 1.5 | 1.5 | 1.5 |
| Lecithin*** | — | 0.1 | 0.1 | — | — |
| SPEs**** | 0.05 | 0.2 | 0.5 | 1.0 | 2.0 |

*Lycasin brand hydrogenated starch hydrolyzate syrup.
**Glycerin and HSH syrup may be blended or co-evaporated.
***Lecithin and SPEs can be pre-blended.
****Flavor and SPEs can be pre-blended.

TABLE 9

|  | Ex. 49 | Ex. 50 | Ex. 51 | Ex. 52 | Ex. 53 | Ex. 54 |
|---|---|---|---|---|---|---|
| Gum Base | 19.2 | 19.2 | 19.2 | 19.2 | 19.2 | 19.2 |
| Sucrose | 49.4 | 48.5 | 44.4 | 43.5 | 34.4 | 43.5 |
| Glycerin | 1.4 | 1.4 | 1.4 | 1.4 | 1.4 | 1.4 |
| Corn Syrup | 14.0 | 14.0 | 14.0 | 14.0 | 14.0 | 14.0 |
| Dextrose | 5.0 | 5.0 | — | — | 10.0 | 5.0 |
| Lactose | 5.0 | 5.0 | 10.0 | 10.0 | — | — |
| Fructose | 5.0 | 5.0 | 10.0 | 10.0 | 10.0 | 5.0 |
| Invert Sugar | — | — | — | — | 10.0 | 10.0 |
| Maltose | — | — | — | — | — | — |
| Corn Syrup Solids | — | — | — | — | — | — |
| Peppermint Flavor | 0.9 | 0.9 | 0.9 | 0.9 | 0.9 | 0.9 |
| SPEs | 0.1 | 1.0 | 0.1 | 1.0 | 0.1 | 1.0 |

|  | Ex. 55 | Ex. 56 | Ex. 57 | Ex. 58 | Ex. 59 | Ex. 60 | Ex. 61 | Ex. 62 |
|---|---|---|---|---|---|---|---|---|
| Gum Base | 19.2 | 19.2 | 19.2 | 19.2 | 19.2 | 19.2 | 19.2 | 19.2 |
| Sucrose | 34.4 | 43.5 | 34.4 | 43.5 | 42.4 | 46.5 | 42.4 | 36.5 |
| Glycerin | 1.4 | 1.4 | 1.4 | 1.4 | 1.4 | 1.4 | 1.4 | 1.4 |
| Corn Syrup | 14.0 | 14.0 | 14.0 | 14.0 | 11.0 | 11.0 | 11.0 | 11.0 |
| Dextrose | 10.0 | 5.0 | 10.0 | 5.0 | 10.0 | 5.0 | 5.0 | 5.0 |
| Lactose | — | — | — | — | — | — | — | — |
| Fructose | 10.0 | 5.0 | 10.0 | 5.0 | 5.0 | 5.0 | 5.0 | 5.0 |
| Invert Sugar | 10.0 | 10.0 | — | — | 5.0 | 5.0 | 5.0 | 5.0 |
| Maltose | — | — | 10.0 | 10.0 | — | — | — | — |
| Corn Syrup Solids | — | — | — | — | 5.0 | 5.0 | 5.0* | 10.0* |
| Peppermint Flavor | 0.9 | 0.9 | 0.9 | 0.9 | 0.9 | 0.9 | 0.9 | 0.9 |
| SPEs | 0.1 | 1.0 | 0.1 | 1.0 | 0.1 | 1.0 | 0.1 | 1.0 |

*5-25DE maltodextrin can be used.

Table 10 shows chewing gum formulations that are free of sugar. These formulations can use a wide variety of other non-sugar alditols.

TABLE 10

| (WEIGHT PERCENT) | | | | | | |
|---|---|---|---|---|---|---|
|  | Ex. 63 | Ex. 64 | Ex. 65 | Ex. 66 | Ex. 67 | Ex. 68 |
| Gum Base | 25.5 | 25.5 | 25.5 | 25.5 | 25.5 | 25.5 |
| Glycerin | 2.0 | 2.0 | 2.0 | 2.0 | 2.0 | 2.0 |
| Sorbitol | 43.9 | 43.0 | 43.9 | 38.0 | 37.9 | 39.0 |
| Mannitol | — | 10.0 | 10.0 | 10.0 | 10.0 | 6.0 |
| Sorbitol Liquid | 17.0 | 17.0 | — | — | — | — |
| Lycasin | — | — | 17.0 | 12.0 | 8.0 | 10.0 |
| Maltitol | 10.0 | — | — | 10.0 | — | — |
| Xylitol | — | — | — | — | 15.0 | 15.0 |
| Lactitol | — | — | — | — | — | — |
| Palatinit | — | — | — | — | — | — |

TABLE 10-continued (WEIGHT PERCENT)

|  |  |  |  |  |  |  |
|---|---|---|---|---|---|---|
| Flavor | 1.5 | 1.5 | 1.5 | 1.5 | 1.5 | 1.5 |
| SPEs | 0.1 | 1.0 | 0.1 | 1.0 | 0.1 | 1.0 |

|  | Ex. 69 | Ex. 70 | Ex. 71 | Ex. 72 | Ex. 73 | Ex. 74 |
|---|---|---|---|---|---|---|
| Gum Base | 25.5 | 25.5 | 25.5 | 25.5 | 25.5 | 25.5 |
| Glycerin | 8.0 | 8.0 | 8.0 | 2.0 | 1.0 | 0.0 |
| Sorbitol | 41.9 | 36.0 | 31.9 | 40.0 | 26.9 | 21.0 |
| Mannitol | 8.0 | 8.0 | 8.0 | — | — | — |
| Sorbitol Liquid | 5.0 | — | — | — | — | — |
| Lycasin | — | 5.0 | 5.0 | 5.0 | 10.0 | 10.0 |
| Maltitol | — | 5.0 | — | — | — | — |
| Xylitol | — | — | — | 15.0 | 10.0 | 20.0 |
| Lactitol | 10.0 | 10.0 | 10.0 | — | — | — |
| Palatinit | — | — | 10.0 | 10.0 | 25.0 | 21.0 |
| Flavor | 1.5 | 1.5 | 1.5 | 1.5 | 1.5 | 1.5 |
| SPEs | 0.1 | 1.0 | 0.1 | 1.0 | 0.1 | 1.0 |

The following examples of the invention are also shown in Table 11 for natural and synthetic gum bases with wax, Table 12 for chewing gum bases that are wax-free and have some reduced tack properties, Table 14 for wax free bubble gum bases and Table 15 for wax-free gum bases having non-tack characteristics. These examples illustrate how sucrose polyesters can be added to a wide variety of chewing gum bases to partially replace some of the oils, fats, and base softeners.

TABLE 11

NATURAL AND SYNTHETIC BASES WITH WAX
(WEIGHT PERCENT)

|  | Ex. 75 | Ex. 76 | Ex. 77 |
|---|---|---|---|
| Butyl Rubber | 11.7 | 10.0 | 9.0 |
| Styrene Butadiene Rubber | — | — | — |
| Polyisobutylene | — | 10.4 | 5.3 |
| Jelutong | — | — | — |
| Ester Gum | 14.8 | — | — |
| Terpene Resin | 9.9 | 6.8 | 16.7 |
| Low MW Polyvinylacetate | 21.2 | 23.2 | 24.6 |
| High MW Polyvinylacetate | — | — | — |
| Talc | — | — | — |
| Calcium Carbonate | 11.2 | 14.7 | 20.1 |
| Acetylated Monoglyceride | — | — | — |
| Hydrogenated Cotton Seed Oil | — | 10.0 | 5.3 |
| Hydrogenated Soybean Oil | 10.0 | 11.1 | 3.3 |
| Partially Hydrogenated Soybean and Palm Oil | — | 2.3 | — |
| Partially Hydrogenated Cottonseed Oil | — | — | — |
| SPEs | 5.7 | 4.3 | 4.2 |
| Lecithin | 2.7 | — | 0.8 |
| Glycerol Monostearate | 3.8 | 4.1 | 2.2 |
| Triacetin | — | — | — |
| Microcrystalline Wax (MP 180° F.) | 6.0 | 3.1 | 8.5 |
| Paraffin Wax (MP 135° F.) | 3.0 | — | — |
|  | 100.0 | 100.0 | 100.0 |

BUBBLE BASES

|  | Ex. 78 | Ex. 79 | Ex. 80 |
|---|---|---|---|
| Butyl Rubber | — | — | 2.5 |
| Styrene Butadiene Rubber | 10.3 | 1.6 | — |
| Polyisobutylene | — | 9.1 | 9.0 |
| Jelutong | — | — | — |
| Ester Gum | 24.7 | 22.5 | 15.0 |
| Terpene Resin | — | — | — |
| Low MW Polyvinylacetate | — | — | — |
| High MW Polyvinylacetate | — | 30.0 | 24.1 |

TABLE 11-continued

|  |  |  |  |
|---|---|---|---|
| Talc | — | — | 25.4 |
| Calcium Carbonate | 56.8 | 21.7 | — |
| Acetylated Monoglyceride | — | — | 4.0 |
| Hydrogenated Cotton Seed Oil | 1.5 | — | — |
| Hydrogenated Soybean Oil | — | — | — |
| Partially Hydrogenated Soybean and Palm Oil | — | 2.0 | — |
| Partially Hydrogenated Cottonseed Oil | — | — | — |
| SPEs | 1.5 | 1.5 | 2.0 |
| Lecithin | — | — | 1.5 |
| Glycerol Monostearate | 1.1 | — | 7.1 |
| Triacetin | — | 4.5 | 3.2 |
| Microcrystalline Wax (MP 180° F.) | — | — | 1.2 |
| Paraffin Wax (MP 135° F.) | 4.1 | 7.1 | 5.0 |
|  | 100.0 | 100.0 | 100.0 |

|  | Ex. 81 | Ex. 82 | Ex. 83 |
|---|---|---|---|
| Butyl Rubber | 6.8 | 6.8 | 8.8 |
| Styrene Butadiene Rubber | — | — | — |
| Polyisobutylene | 3.0 | 3.2 | 4.1 |
| Jelutong | 21.1 | 18.2 | 4.0 |
| Ester Gum | 16.7 | 16.6 | — |
| Terpene Resin | — | — | 17.3 |
| Low MW Polyvinylacetate | 16.6 | 16.1 | 25.0 |
| High MW Polyvinylacetate | — | — | — |
| Talc | — | — | 18.1 |
| Calcium Carbonate | 13.2 | 19.7 | — |
| Acetylated Monoglyceride | — | — | — |
| Hydrogenated Cotton Seed Oil | 2.3 | — | 4.5 |
| Hydrogenated Soybean Oil | — | 3.2 | 2.7 |
| Partially Hydrogenated Soybean and Palm Oil | — | — | — |
| Partially Hydrogenated Cottonseed Oil | — | 2.0 | — |
| SPEs | 3.0 | 1.8 | 3.3 |
| Lecithin | — | — | — |
| Glycerol Monostearate | 2.1 | 4.5 | 4.1 |
| Triacetin | — | — | — |
| Microcrystalline Wax (MP 180° F.) | 15.2 | 6.8 | 6.1 |
| Paraffin Wax (MP 135° F.) | — | 1.1 | 2.0 |
|  | 100.0 | 100.0 | 100.0 |

|  | Ex. 84 Bubble Base | Ex. 85 | Ex. 86 |
|---|---|---|---|
| Butyl Rubber | — | 9.1 | 9.3 |
| Styrene Butadiene Rubber | — | — | — |
| Polyisobutylene | 8.0 | 3.5 | 10.5 |
| Jelutong | — | 3.1 | — |
| Ester Gum | 14.7 | 1.5 | — |
| Terpene Resin | — | 15.0 | 13.0 |
| Low MW Polyvinylacetate | — | 22.8 | 23.0 |
| High MW Polyvinylacetate | 34.5 | — | — |
| Talc | 28.6 | — | — |
| Calcium Carbonate | — | 23.0 | 14.9 |
| Acetylated Monoglyceride | 2.5 | — | — |
| Hydrogenated Cotton Seed Oil | — | 4.6 | 8.0 |
| Hydrogenated Soybean Oil | — | 2.9 | 5.2 |
| Partially Hydrogenated Soybean and Palm Oil | — | — | 3.1 |
| Partially Hydrogenated Cottonseed Oil | — | — | 1.5 |
| SPEs | 0.9 | 2.4 | 2.1 |
| Lecithin | — | 0.8 | — |
| Glycerol Monostearate | 4.4 | 2.8 | 4.5 |
| Triacetin | 4.6 | — | — |
| Microcrystalline Wax (MP 180° F.) | — | 7.0 | 4.4 |
| Paraffin Wax (MP 135° F.) | 1.8 | 1.5 | 0.5 |
|  | 100.0 | 100.0 | 100.0 |

|  | Ex. 87 | Ex. 88 | Ex. 89 Bubble Base |
|---|---|---|---|
| Butyl Rubber | 6.1 | 8.1 | — |
| Styrene Butadiene Rubber | — | — | 6.0 |

TABLE 11-continued

| | | | |
|---|---|---|---|
| Polyisobutylene | 7.1 | 5.5 | 7.5 |
| Jelutong | — | — | — |
| Ester Gum | — | 7.1 | 12.2 |
| Terpene Resin | 14.1 | 7.1 | — |
| Low MW Polyvinylacetate | 28.1 | 22.2 | — |
| High MW Polyvinylacetate | — | — | 29.0 |
| Talc | — | — | 28.9 |
| Calcium Carbonate | 18.9 | 25.6 | — |
| Acetylated Monoglyceride | — | — | 3.7 |
| Hydrogenated Cotton Seed Oil | 10.1 | 13.2 | 3.7 |
| Hydrogenated Soybean Oil | 5.1 | 5.1 | — |
| Partially Hydrogenated Soybean and Palm Oil | — | — | — |
| Partially Hydrogenated Cottonseed Oil | — | — | — |
| SPEs | 4.1 | 4.1 | 1.3 |
| Lecithin | 0.7 | 0.5 | — |
| Glycerol Monostearate | 1.5 | 1.5 | 2.1 |
| Triacetin | — | — | 1.2 |
| Microcrystalline Wax (MP 180° F.) | 3.1 | — | 4.4 |
| Paraffin Wax (MP 135° F.) | 1.1 | — | — |
| | 100.0 | 100.0 | 100.0 |

TABLE 12

WAX-FREE GUM BASES FOR USE IN CHEWING GUM HAVING SOME REDUCED TACK CHARACTERISTICS (EXAMPLES 90-119)

EXAMPLES 90-94

| GENERIC INGREDIENTS | \multicolumn{5}{c}{IDENTIFICATION - EXAMPLES #:} |
|---|---|---|---|---|---|
| | 90 | 91 | 92 | 93 | 94 |
| **  SYNTHETIC ELASTOMER  ** | | | | | |
| STYRENE-BUTADIENE ELASTOMER | 5.3 | — | 2.1 | 1.8 | — |
| BUTYL (ISOPRENE-ISOBUTYLENE) ELASTOMER | 8.6 | 7.9 | 7.2 | — | 8.1 |
| POLYISOBUTYLENE ELASTOMER | 7.1 | — | 7.4 | 24.8 | 3.6 |
| POLYVINYL ACETATE | 10.5 | 27.2 | 15.3 | 10.1 | 27.3 |
| **  ELASTOMER PLASTICIZERS  ** | | | | | |
| GLYCEROL ESTERS OF ROSIN | 2.1 | — | 19.0 | 3.7 | — |
| GLYCEROL ESTERS OF PART HYD ROSIN | 4.3 | 18.2 | — | 7.9 | — |
| TERPENE RESINS | 10.8 | — | — | 7.1 | 26.8 |
| **  FILLER  ** | | | | | |
| CALCIUM CARBONATE | — | 15.9 | 20.7 | 17.7 | 11.4 |
| TALC | 25.5 | — | — | — | — |
| **  SOFTENER  ** | | | | | |
| HYDROGENATED COTTONSEED OIL | — | 6.0 | — | 7.0 | — |
| HYDROGENATED SOYBEAN OIL | 6.3 | — | 7.1 | — | — |
| PARTIALLY HYDROGENATED SOYBEAN AND PALM OIL | 3.3 | — | 7.0 | — | 9.1 |
| PARTIALLY HYDROGENATED COTTONSEED OIL | — | 8.3 | — | 8.0 | — |
| SPEs | 7.7 | 11.3 | 12.2 | 7.0 | 5.2 |
| GLYCEROL MONOSTEARATE | 6.2 | 4.4 | 2.0 | 2.5 | 4.8 |
| LECITHIN | 2.3 | 0.8 | — | 2.4 | 3.7 |
| TOTAL PERCENT | 100.0 | 100.0 | 100.0 | 100.0 | 100.0 |

TABLE 12-continued

WAX-FREE GUM BASES FOR USE IN CHEWING GUM HAVING SOME REDUCED TACK CHARACTERISTICS (EXAMPLES 90-119)

EXAMPLES 95-97

| GENERIC INGREDIENTS | IDENTIFICATION EXAMPLES #: | | |
|---|---|---|---|
| | 95 | 96 | 97 |
| **  SYNTHETIC ELASTOMER  ** | | | |
| STYRENE-BUTADIENE ELASTOMER | 5.2 | 2.1 | 5.9 |
| BUTYL (ISOPRENE-ISOBUTYLENE) ELASTOMER | 4.1 | 7.2 | 6.9 |
| POLYISOBUTYLENE ELASTOMER | 5.9 | 7.3 | 2.0 |
| POLYVINYL ACETATE | 25.7 | 15.3 | 24.8 |
| **  ELASTOMER PLASTICIZERS  ** | | | |
| GLYCEROL ESTERS OF ROSIN | 23.5 | 19.1 | 8.6 |
| GLYCEROL ESTERS OF PART HYD ROSIN | — | — | 8.0 |
| TERPENE RESINS | 3.2 | — | 1.9 |
| **  FILLER  ** | | | |
| CALCIUM CARBONATE | 15.1 | 20.7 | 9.9 |
| TALC | — | — | 7.2 |
| **  SOFTENER  ** | | | |
| HYDROGENATED COTTONSEED OIL | — | — | 7.0 |
| HYDROGENATED SOYBEAN OIL | — | — | — |
| PARTIALLY HYDROGENATED SOYBEAN AND PALM OIL | 5.5 | 8.3 | 5.0 |
| PARTIALLY HYDROGENATED COTTONSEED OIL | 3.0 | 10.6 | — |
| SPEs | 3.7 | 6.4 | 10.0 |
| GLYCEROL MONOSTEARATE | 5.1 | 3.0 | 2.7 |
| LECITHIN | — | — | — |
| TOTAL PERCENT | 100.0 | 100.0 | 100.0 |

EXAMPLES 98-101

| GENERIC INGREDIENTS | IDENTIFICATION - EXAMPLES #: | | | |
|---|---|---|---|---|
| | 98 | 99 | 100 | 101 |
| **  SYNTHETIC ELASTOMER  ** | | | | |
| STYRENE-BUTADIENE ELASTOMER | 3.9 | 2.1 | — | — |
| BUTYL (ISOPRENE-ISOBUTYLENE) ELASTOMER | 5.3 | 6.0 | 8.9 | 3.6 |
| POLYISOBUTYLENE ELASTOMER | 12.7 | 8.5 | 10.0 | 11.1 |
| POLYVINYL ACETATE | 14.9 | 15.3 | 21.3 | 21.9 |
| **  ELASTOMER PLACTICIZERS  ** | | | | |
| GLYCEROL ESTERS OF ROSIN | — | 10.1 | — | 19.6 |
| GLYCEROL ESTERS OF PART HYD ROSIN | — | 8.9 | — | 11.2 |
| TERPENE RESINS | 21.4 | — | 9.7 | 3.7 |
| **  FILLER  ** | | | | |
| CALCIUM CARBONATE | 13.7 | 20.9 | 21.5 | 6.4 |
| TALC | 1.4 | — | — | — |
| **  SOFTENER  ** | | | | |
| HYDROGENATED COTTONSEED OIL | — | 4.2 | — | 5.0 |
| HYDROGENATED SOYBEAN OIL | 1.7 | — | 5.0 | — |
| PARTIALLY HYDROGENATED SOYBEAN AND PALM OIL | 5.7 | 2.0 | — | 10 |

TABLE 12-continued

WAX-FREE GUM BASES FOR USE IN CHEWING GUM HAVING SOME REDUCED TACK CHARACTERISTICS (EXAMPLES 90–119)

| | | | | |
|---|---|---|---|---|
| PARTIALLY HYDROGENATED COTTONSEED OIL | — | — | 15.0 | — |
| SPEs | 17.0 | 20.0 | 3.2 | 4.2 |
| GLYCEROL MONOSTEARATE | — | 2.0 | 5.4 | 3.3 |
| LECITHIN | 2.3 | — | — | — |
| TOTAL PERCENT | 100.0 | 100.0 | 100.0 | 100.0 |

EXAMPLES 102–106

| GENERIC INGREDIENTS | IDENTIFICATION - EXAMPLES #: | | | | |
|---|---|---|---|---|---|
| | 102 | 103 | 104 | 105 | 106 |
| SYNTHETIC ELASTOMER | | | | | |
| STYRENE-BUTADIENE ELASTOMER | — | 3.2 | 4.1 | — | — |
| BUTYL (ISOPRENE-ISOBUTYLENE) ELASTOMER | 7.4 | 7.3 | 11.3 | 10.0 | 8.3 |
| POLYISOBUTYLENE ELASTOMER | 1.9 | 7.5 | 7.9 | 1.9 | 3.6 |
| POLYVINYL ACETATE | 24.8 | 21.1 | 18.2 | 27.6 | 27.5 |
| ELASTOMER PLASTICIZERS | | | | | |
| GLYCEROL ESTERS OF ROSIN | — | 15.3 | — | — | — |
| GLYCEROL ESTERS OF PART HYD ROSIN | — | 2.4 | 26.2 | — | — |
| TERPENE RESINS | 25.8 | 5.8 | 1.4 | 25.3 | 25.3 |
| FILLER | | | | | |
| CALCIUM CARBONATE | 18.6 | — | 13.6 | 11.3 | 11.3 |
| TALC | — | 14.8 | — | — | — |
| SOFTENER | | | | | |
| HYDROGENATED COTTONSEED OIL | 4.0 | 4.4 | 3.2 | — | 3.0 |
| HYDROGENATED SOYBEAN OIL | — | — | — | 2.4 | 4.0 |
| PARTIALLY HYDROGENATED SOYBEAN AND PALM OIL | — | 5.0 | — | — | 4.2 |
| PARTIALLY HYDROGENATED COTTONSEED OIL | — | — | — | 4.0 | — |
| SPEs | 10.3 | 11.4 | 7.0 | 13.0 | 8.3 |
| GLYCEROL MONOSTEARATE | 2.4 | 1.8 | 3.2 | 0.8 | 1.8 |
| LECITHIN | 4.8 | — | 3.9 | 3.7 | 2.7 |
| TOTAL PERCENT | 100.0 | 100.0 | 100.0 | 100.0 | 100.0 |

EXAMPLES 107–110

| GENERIC INGREDIENTS | IDENTIFICATION EXAMPLES #: | | | |
|---|---|---|---|---|
| | 107 | 108 | 109 | 110 |
| NATURAL ELASTOMER | | | | |
| NATURAL GUM | 22.0 | 25.1 | 22.8 | 17.6 |
| SYNTHETIC ELASTOMER | | | | |
| STYRENE-BUTADIENE ELASTOMER | — | 1.9 | 2.6 | — |
| BUTYL (ISOPRENE-ISOBUTYLENE) ELASTOMER | 4.8 | 2.1 | 4.1 | 10.2 |
| POLYISOBUTYLENE ELASTOMER | 5.7 | 4.7 | 3.2 | 2.1 |
| POLYVINYL ACETATE | 16.4 | 24.8 | 16.3 | 26.9 |
| ELASTOMER PLASTICIZERS | | | | |
| GLYCEROL ESTERS OF ROSIN | 3.8 | 3.2 | 6.9 | 11.3 |
| GLYCEROL ESTERS OF PART HYD ROSIN | 12.3 | 12.6 | 11.8 | 4.8 |
| METHYL ESTERS OF ROSIN | — | 2.1 | 1.7 | — |
| TERPENE RESINS | — | — | — | — |
| FILLER | | | | |
| CALCIUM CARBONATE | — | 4.4 | 9.3 | — |
| TALC | 7.1 | — | — | 4.6 |
| SOFTENER | | | | |
| HYDROGENATED COTTONSEED OIL | — | — | 10.0 | — |
| HYDROGENATED SOYBEAN OIL | 5.0 | — | — | 5.6 |
| PARTIALLY HYDROGENATED SOYBEAN AND PALM OIL | 11.0 | 12.0 | 3.7 | 8.0 |
| PARTIALLY HYDROGENATED COTTONSEED OIL | 5.0 | — | — | — |
| SPEs | 0.8 | 0.6 | 4.5 | 5.6 |
| GLYCEROL MONOSTEARATE | 6.1 | 3.8 | — | 3.3 |
| LECITHIN | — | 2.7 | 3.1 | — |
| TOTAL PERCENT | 100.0 | 100.0 | 100.0 | 100.0 |

EXAMPLES 111–114

| GENERIC INGREDIENTS | IDENTIFICATION - EXAMPLES #: | | | |
|---|---|---|---|---|
| | 111 | 112 | 113 | 114 |
| NATURAL ELASTOMER | | | | |
| NATURAL GUM | 15.7 | 22.6 | 22.2 | 21.1 |
| SYNTHETIC ELASTOMER | | | | |
| STYRENE-BUTADIENE ELASTOMER | 1.9 | — | — | — |
| BUTYL (ISOPRENE-ISOBUTYLENE) ELASTOMER | 3.7 | 5.8 | 5.7 | 6.1 |
| POLYISOBUTYLENE ELASTOMER | 4.1 | 3.1 | 3.1 | 2.8 |
| POLYVINYL ACETATE | 26.2 | 20.4 | 22.0 | 18.0 |
| ELASTOMER PLASTICIZERS | | | | |
| GLYCEROL ESTERS OF ROSIN | — | — | — | 15.7 |
| GLYCEROL ESTERS OF PART HYD ROSIN | 15.3 | 11.7 | 15.2 | — |
| METHYL ESTERS OF ROSIN | — | 4.0 | — | — |
| TERPENE RESINS | — | — | — | — |
| FILLER | | | | |
| CALCIUM CARBONATE | 12.2 | 11.6 | 11.4 | — |
| TALC | — | — | — | 15.4 |
| SOFTENER | | | | |
| HYDROGENATED COTTONSEED OIL | — | 2.0 | — | 9.1 |
| HYDROGENATED SOYBEAN OIL | 3.0 | — | 6.2 | — |
| PARTIALLY HYDROGENATED SOYBEAN AND PALM OIL | — | 15.0 | — | 2.0 |
| PARTIALLY HYDROGENATED COTTONSEED OIL | 12.0 | — | 6.0 | — |
| SPEs | 0.1 | 0.5 | 4.9 | 6.0 |
| GLYCEROL MONOSTEARATE | 5.8 | 3.3 | 3.3 | 3.8 |
| LECITHIN | — | — | — | — |
| TOTAL PERCENT | 100.0 | 100.0 | 100.0 | 100.0 |

EXAMPLES 115–119

| GENERIC INGREDIENTS | IDENTIFICATION - EXAMPLES #: | | | | |
|---|---|---|---|---|---|
| | 115 | 116 | 117 | 118 | 119 |
| NATURAL ELASTOMER | | | | | |
| NATURAL GUM | 23.8 | 18.7 | 14.4 | 18.2 | 25.2 |

TABLE 12-continued

WAX-FREE GUM BASES FOR USE IN CHEWING GUM HAVING SOME REDUCED TACK CHARACTERISTICS (EXAMPLES 90–119)

SYNTHETIC ELASTOMER

| | | | | | |
|---|---|---|---|---|---|
| STYRENE-BUTADIENE ELASTOMER | — | — | — | — | — |
| BUTYL (ISOPRENE-ISOBUTYLENE) ELASTOMER | 3.1 | 6.0 | 9.1 | 6.8 | 2.4 |
| POLYISOBUTYLENE ELASTOMER | 7.7 | 5.5 | 3.6 | 5.4 | 4.9 |
| POLYVINYL ACETATE | 20.5 | 14.8 | 18.1 | 15.5 | 19.9 |

ELASTOMER PLASTICIZERS

| | | | | | |
|---|---|---|---|---|---|
| GLYCEROL ESTERS OF ROSIN | — | — | 11.9 | — | 15.6 |
| GLYCEROL ESTERS OF PART HYD ROSIN | 10.4 | 15.5 | 13.0 | 12.7 | — |
| METHYL ESTERS OF ROSIN | 2.0 | — | — | 2.6 | — |
| TERPENE RESINS | 5.1 | — | — | — | 2.1 |

FILLER

| | | | | | |
|---|---|---|---|---|---|
| CALCIUM CARBONATE | — | 18.8 | 14.1 | 15.7 | — |
| TALC | 5.3 | — | — | — | 7.1 |

SOFTENER

| | | | | | |
|---|---|---|---|---|---|
| HYDROGENATED COTTONSEED OIL | — | 8.5 | 7.0 | — | — |
| HYDROGENATED SOYBEAN OIL | 8.9 | — | — | 6.0 | 10.0 |
| PARTIALLY HYDROGENATED SOYBEAN AND PALM OIL | — | — | 2.0 | — | — |
| PARTIALLY HYDROGENATED COTTONSEED OIL | — | — | — | 6.0 | 2.0 |
| SPEs | 7.9 | 6.5 | 6.8 | 5.0 | 8.4 |
| GLYCEROL MONOSTEARATE | 5.3 | 5.7 | — | 6.1 | 2.4 |
| LECITHIN | — | — | — | — | — |
| TOTAL PERCENT | 100.0 | 100.0 | 100.0 | 100.0 | 100.0 |

TABLE 13

WAX-FREE GUM BASES FOR USE IN BUBBLE GUM (EXAMPLES 120–128)

EXAMPLES 120–123

| GENERIC INGREDIENTS | 120 | 121 | 122 | 123 |
|---|---|---|---|---|
| **\*\* SYNTHETIC ELASTOMER \*\*** | | | | |
| POLYISOBUTYLENE ELASTOMER | 17.1 | 11.7 | 11.6 | 5.4 |
| POLYVINYL ACETATE | 24.9 | 29.4 | 31.5 | 34.8 |
| **\*\* ELASTOMER PLASTICIZERS \*\*** | | | | |
| GLYCEROL ESTERS OF ROSIN | 6.8 | 10.7 | 19.8 | 16.3 |
| GLYCEROL ESTERS OF PART HYD ROSIN | — | — | — | — |
| **\*\* FILLER \*\*** | | | | |
| CALCIUM CARBONATE | — | — | — | 30.2 |
| TALC | 34.7 | 34.1 | 21.9 | — |
| **\*\* SOFTENER \*\*** | | | | |
| SPEs | 1.1 | 3.4 | 3.0 | 2.0 |
| GLYCEROL TRIACETATE | 4.6 | 4.4 | 5.0 | 5.3 |
| GLYCEROL MONOSTEARATE | 5.8 | 4.3 | 4.9 | 3.9 |
| ACETYLATED MONO-GLYCERIDE | 5.0 | 2.0 | 2.3 | 2.1 |
| TOTAL PERCENT | 100.0 | 100.0 | 100.0 | 100.0 |

TABLE 13-continued

WAX-FREE GUM BASES FOR USE IN BUBBLE GUM (EXAMPLES 120–128)

EXAMPLES 124–128

| GENERIC INGREDIENTS | 124 | 125 | 126 | 127 | 128 |
|---|---|---|---|---|---|
| **\*\* SYNTHETIC ELASTOMER \*\*** | | | | | |
| POLYISOBUTYLENE ELASTOMER | 7.9 | 13.0 | 7.9 | 11.6 | 11.8 |
| POLYVINYL ACETATE | 34.2 | 37.1 | 34.2 | 37.8 | 35.6 |
| **\*\* ELASTOMER PLASTICIZERS \*\*** | | | | | |
| GLYCEROL ESTERS OF ROSIN | 14.8 | — | — | — | — |
| GLYCEROL ESTERS OF PART HYD ROSIN | — | 19.8 | 14.8 | 19.8 | 19.8 |
| **\*\* FILLER \*\*** | | | | | |
| CALCIUM CARBONATE | 29.8 | 16.5 | 29.8 | — | — |
| TALC | — | — | — | 17.0 | 19.7 |
| **\*\* SOFTENER \*\*** | | | | | |
| SPEs | 1.0 | 3.5 | 3.0 | 2.6 | 0.8 |
| GLYCEROL TRIACETATE | 5.3 | 5.6 | 4.3 | 3.0 | 4.0 |
| GLYCEROL MONOSTEARATE | 4.0 | 4.5 | 3.0 | 3.2 | 2.3 |
| ACETYLATED MONO-GLYCERIDE | 3.0 | — | 3.0 | 5.0 | 6.0 |
| TOTAL PERCENT | 100.0 | 100.0 | 100.0 | 100.0 | 100.0 |

TABLE 14

WAX-FREE GUM BASES FOR USE IN CHEWING GUM HAVING NON-TACK CHARACTERISTICS (EXAMPLES 129–140)

EXAMPLES 129–134

| GENERIC INGREDIENTS | 129 | 130 | 131 | 132 | 133 | 134 |
|---|---|---|---|---|---|---|
| **\*\* SYNTHETIC ELASTOMER \*\*** | | | | | | |
| BUTYL (ISOPRENE-ISOBUTYLENE) ELASTOMER | — | — | — | 25.0 | 9.0 | 14.1 |
| POLYISOBUTYLENE | 35.0 | 17.0 | 20.0 | — | 16.9 | 12.1 |
| POLYVINYL ACETATE | — | 17.0 | 30.0 | 5.0 | 22.8 | 20.8 |
| **\*\* FILLER \*\*** | | | | | | |
| CALCIUM CARBONATE | 25.0 | 40.0 | 5.0 | 25.0 | — | 13.9 |
| TALC | — | — | — | — | 12.0 | — |
| **\*\* SOFTENERS \*\*** | | | | | | |
| HYDROGENATED SOYBEAN OIL | 5.0 | — | 15.0 | — | 14.8 | 7.7 |
| HYDROGENATED COTTONSEED OIL | — | 8.0 | — | 15.0 | 14.0 | 10.0 |
| PARTIALLY HYDROGENATED SOYBEAN AND PALM OIL | 20.0 | 2.0 | — | 17.0 | — | 7.0 |
| PARTIALLY HYDROGENATED COTTONSEED OIL | 3.0 | — | 10.0 | — | — | 7.7 |
| SPEs | 5.0 | 8.0 | 5.0 | 10.0 | 8.8 | 4.0 |
| GLYCEROL MONOSTEARATE | 7.0 | — | 5.0 | 2.0 | 1.7 | 2.7 |
| LECITHIN | — | 8.0 | — | — | — | — |

TABLE 14-continued

WAX-FREE GUM BASES FOR USE IN CHEWING GUM HAVING
NON-TACK CHARACTERISTICS (EXAMPLES 129–140)

EXAMPLES 135–140

IDENTIFICATION - EXAMPLES #:

| GENERIC INGREDIENTS | 135 | 136 | 137 | 138 | 139 | 140 |
|---|---|---|---|---|---|---|
| ** SYNTHETIC ELASTOMER ** | | | | | | |
| BUTYL (ISOPRENE-ISOBUTYLENE) ELASTOMER | 16.0 | 9.9 | 9.9 | 10.0 | 10.0 | 13.3 |
| POLYISOBUTYLENE | 10.0 | 15.5 | 15.5 | 15.9 | 15.9 | 21.2 |
| POLYVINYL ACETATE | 14.0 | 22.0 | 22.0 | 21.7 | 21.6 | 29.1 |
| ** FILLER ** | | | | | | |
| CALCIUM CARBONATE | 5.0 | 12.9 | 12.9 | 13.3 | — | 17.7 |
| TALC | 10.0 | — | — | — | 13.1 | — |
| ** SOFTENERS ** | | | | | | |
| HYDROGENATED SOYBEAN OIL | — | 14.0 | 9.0 | 3.3 | 13.5 | 6.1 |
| HYDROGENATED COTTONSEED OIL | — | 13.0 | 13.0 | 3.3 | 13.5 | 6.1 |
| PARTIALLY HYDROGENATED SOYBEAN AND PALM OIL | 5.0 | — | 10.0 | — | — | 2.0 |
| PARTIALLY HYDROGENATED COTTONSEED OIL | — | — | — | 9.8 | — | — |
| SPEs | 35.0 | 10.0 | 5.0 | 20.0 | 9.8 | 3.2 |
| GLYCEROL MONOSTEARATE | — | 2.7 | 1.7 | 2.7 | 2.6 | 1.3 |
| LECITHIN | — | — | 1.0 | — | — | — |

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A gum base comprising:
   an elastomer; and
   at least 0.02% by weight of sucrose fatty acid esters chosen from the group consisting of hexa-, hepta- and octa- fatty acids.

2. The gum base of claim 1 wherein the sucrose fatty acid esters are chosen from the group consisting of: sucrose octapalmitate, sucrose octastearate, and sucrose octaoleate.

3. The gum base of claim 1 wherein the base is wax-free.

4. The gum base of claim 1 wherein the base is non-tacky.

5. The gum base of claim 1 wherein the base is a bubble gum-type base.

6. The gum base of claim 1 including at least one resin.

7. The gum base of claim 1 including at least one softener chosen from the group consisting of: tallow; hydrogenated tallow; hydrogenated and partially hydrogenated vegetable oils; cocoa butter; glycerol monostearate; glycerol triacetate; and lecithin.

8. The gum base of claim 1 wherein the sucrose fatty acid esters comprise not more than 40% by weight of the base.

9. A chewing gum formulation comprising:
   an insoluble gum base;
   a water soluble portion;
   a flavor; and
   at least 0.01% by weight of sucrose fatty acid esters chosen from the group consisting of hexa-, hepta- and octa- fatty acids.

10. The gum base of claim 9 wherein the sucrose fatty acid esters are chosen from the group consisting of: sucrose octapalmitate, sucrose octastearate, and sucrose octaoleate.

11. The chewing gum formulation of claim 9 including at least one softener chosen from the group consisting of: tallow; hydrogenated tallow; hydrogenated and partially hydrogenated vegetable oils; cocoa butter; glycerol monostearate; glycerol triacetate; and lecithin.

12. The chewing gum formulation of claim 9 wherein the sucrose fatty acid esters comprise not more than 5% by weight of the chewing gum formulation.

13. The chewing gum formulation of claim 9 wherein the formulation includes a bulk sweetener.

14. The chewing gum formulation of claim 9 wherein the formulation includes a high intensity sweetener.

15. The chewing gum formulation of claim 9 wherein the formulation includes an emulsifier.

16. The chewing gum formulation of claim 9 wherein the formulation includes an elastomer plasticizer.

17. The chewing gum formulation of claim 9 wherein the formulation includes an elastomer.

18. The chewing gum formulation of claim 9 wherein the formulation includes lecithin.

* * * * *